US011268453B1

(12) United States Patent
Desjardins et al.

(10) Patent No.: US 11,268,453 B1
(45) Date of Patent: Mar. 8, 2022

(54) LUBRICATION SYSTEM FOR AIRCRAFT ENGINE REDUCTION GEARBOX

(71) Applicant: PRATT & WHITNEY CANADA CORP., Longueuil (CA)

(72) Inventors: Michel Desjardins, St-Hubert (CA); Vincent Savaria, Laval (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/203,902

(22) Filed: Mar. 17, 2021

(51) Int. Cl.
F16H 57/04 (2010.01)
F02C 7/36 (2006.01)
F16H 57/08 (2006.01)
F02C 7/06 (2006.01)

(52) U.S. Cl.
CPC ........... F02C 7/36 (2013.01); F16H 57/0479 (2013.01); F02C 7/06 (2013.01); F05D 2220/323 (2013.01); F05D 2240/50 (2013.01); F05D 2260/40311 (2013.01); F05D 2260/98 (2013.01); F16H 57/082 (2013.01)

(58) Field of Classification Search
CPC ....... F02C 7/36; F16H 57/0479; F16H 57/082
See application file for complete search history.

(56) References Cited

U.S. PATENT DOCUMENTS

| 1,417,797 | A | 5/1922 | Cook et al. |
| 2,700,311 | A | 11/1949 | Bade |
| 5,152,668 | A | 10/1992 | Bulman et al. |
| 5,154,372 | A | 10/1992 | Hora et al. |
| 5,310,391 | A | 5/1994 | Takahashi |
| 5,366,422 | A | 11/1994 | Dye et al. |
| 6,735,954 | B2 | 5/2004 | Macfarlane |
| 7,055,303 | B2 | 6/2006 | MacFarlane |

(Continued)

FOREIGN PATENT DOCUMENTS

| CA | 2562290 C | 10/2013 |
| CA | 3016717 A1 | 3/2019 |

(Continued)

OTHER PUBLICATIONS

European Search Report dated Jun. 5, 2020, Application Serial No. 20164853.2.

(Continued)

Primary Examiner — Derek D Knight
(74) Attorney, Agent, or Firm — Norton Rose Fulbright Canada LLP

(57) ABSTRACT

An epicyclic gear train includes a sun gear and planet gears mounted to a carrier and engaged to the sun gear. The planet gears and the carrier are rotatable about a center axis, and the carrier is engaged with a power output at a carrier-output engagement location. Ring gears are in meshed engagement with the planet gears. Planet gear bearings are disposed between one of the planet gears and the carrier. A lubrication interface is defined between each planet gear bearing and one of the planet gears. A bearing lubrication system includes a lubricant supply conduit extending between a conduit inlet at the carrier-output engagement location and conduit outlets at the lubrication interfaces of the planet gear bearings. A lubricant strainer is mounted about the conduit inlet at the carrier-output engagement location.

20 Claims, 8 Drawing Sheets

(56) References Cited

U.S. PATENT DOCUMENTS

| | | | |
|---|---|---|---|
| 7,104,918 | B2 | 9/2006 | Mitrovic |
| 7,223,197 | B2 | 5/2007 | Poulin et al. |
| 7,364,526 | B2 | 4/2008 | Cho |
| 7,500,935 | B2 | 3/2009 | Waide |
| 9,145,834 | B2 | 9/2015 | Frost et al. |
| 9,752,500 | B2 | 9/2017 | Ullyott |
| 9,890,704 | B2 | 2/2018 | Speak et al. |
| 10,215,055 | B2 | 2/2019 | Curlier et al. |
| 10,240,522 | B2 | 3/2019 | Jones et al. |
| 10,364,752 | B2 | 7/2019 | Moniz et al. |
| 10,371,060 | B2 | 8/2019 | Lamarre et al. |
| 10,371,170 | B2 | 8/2019 | Yu |
| 10,378,438 | B2 | 8/2019 | Skertic |
| 10,385,785 | B2 | 8/2019 | MacFarlane et al. |
| 10,393,027 | B2 | 8/2019 | Lefebvre et al. |
| 10,422,243 | B2 | 9/2019 | Suciu et al. |
| 10,422,286 | B2 | 9/2019 | Le Pache et al. |
| 10,458,422 | B2 | 10/2019 | Gomanne et al. |
| 10,465,611 | B2 | 11/2019 | Durocher et al. |
| 10,473,035 | B2 | 11/2019 | Brault et al. |
| 10,519,871 | B2 * | 12/2019 | Desjardins ............ F02C 7/36 |
| 10,526,975 | B2 | 1/2020 | Howell et al. |
| 10,526,976 | B2 | 1/2020 | Suciu et al. |
| 10,526,977 | B2 | 1/2020 | Corpron |
| 10,533,559 | B2 | 1/2020 | Plante et al. |
| 10,539,065 | B2 | 1/2020 | Julien et al. |
| 10,539,076 | B2 | 1/2020 | Niergarth et al. |
| 10,544,733 | B2 | 1/2020 | Julien |
| 10,550,764 | B2 | 2/2020 | Roberge |
| 10,563,513 | B2 | 2/2020 | Kalitzin et al. |
| 10,563,591 | B2 | 2/2020 | Muldoon |
| 10,563,593 | B2 | 2/2020 | McNeil et al. |
| 2009/0062058 | A1 | 3/2009 | Kimes et al. |
| 2009/0233754 | A1 | 9/2009 | Pederson |
| 2010/0317478 | A1 * | 12/2010 | McCune ............ F16H 57/0482 |
| | | | 475/159 |
| 2011/0305572 | A1 | 12/2011 | Bellis |
| 2012/0317991 | A1 | 12/2012 | Frost et al. |
| 2014/0083107 | A1 | 3/2014 | Sheridan |
| 2015/0354672 | A1 | 12/2015 | Bouwer et al. |
| 2016/0010562 | A1 | 1/2016 | Sheridan |
| 2016/0040601 | A1 | 2/2016 | Frost et al. |
| 2016/0201568 | A1 * | 7/2016 | Sheridan ............ F01D 25/20 |
| | | | 415/1 |
| 2016/0230843 | A1 | 8/2016 | Duong |
| 2017/0198786 | A1 | 7/2017 | Chhuor |
| 2018/0216531 | A1 | 8/2018 | Mccune |
| 2018/0334964 | A1 | 11/2018 | Desjardins et al. |
| 2019/0024582 | A1 | 1/2019 | Poulin |
| 2019/0032920 | A1 | 1/2019 | Giambra et al. |
| 2019/0048802 | A1 | 2/2019 | Desjardins et al. |
| 2019/0128181 | A1 | 5/2019 | Smith |
| 2019/0145322 | A1 | 5/2019 | Sellick et al. |
| 2019/0234242 | A1 | 8/2019 | Ramakrishnan et al. |
| 2019/0257246 | A1 | 8/2019 | Higgins |
| 2019/0323436 | A1 | 10/2019 | Mitrovic |
| 2019/0338670 | A1 | 11/2019 | Reid |
| 2019/0338705 | A1 | 11/2019 | Reid |
| 2019/0360356 | A1 | 11/2019 | Savaria et al. |
| 2019/0376595 | A1 | 12/2019 | Meyer et al. |
| 2019/0376596 | A1 | 12/2019 | Clark et al. |
| 2019/0383215 | A1 | 12/2019 | Sheaf et al. |
| 2020/0003157 | A1 | 1/2020 | Clements et al. |
| 2020/0011241 | A1 | 1/2020 | Karam |
| 2020/0025102 | A1 | 1/2020 | Kallianteris et al. |
| 2020/0049026 | A1 | 2/2020 | Hughes et al. |
| 2020/0056507 | A1 | 2/2020 | Walker |
| 2020/0056543 | A1 | 2/2020 | Walker |
| 2020/0062382 | A1 | 2/2020 | Schank |

FOREIGN PATENT DOCUMENTS

| | | |
|---|---|---|
| CA | 3040560 A1 | 10/2019 |
| CA | 3011124 C | 1/2020 |
| CA | 2822965 C | 2/2020 |
| CN | 10551834 | 4/2019 |
| CN | 105518347 | 4/2019 |
| CN | 109723559 A | 5/2019 |
| EP | 2535544 A2 | 12/2012 |
| EP | 3135882 A1 | 3/2017 |
| EP | 3361122 | 8/2018 |
| EP | 3361122 A1 | 8/2018 |
| EP | 3135920 B1 | 12/2018 |
| EP | 2261467 B1 | 1/2019 |
| EP | 2519722 B1 | 2/2019 |
| EP | 2917590 B1 | 3/2019 |
| EP | 3460182 A1 | 3/2019 |
| EP | 3070304 B1 | 4/2019 |
| EP | 3464833 A2 | 4/2019 |
| EP | 2728140 B1 | 6/2019 |
| EP | 3092396 B1 | 9/2019 |
| EP | 3538751 A1 | 9/2019 |
| EP | 2472081 B1 | 10/2019 |
| EP | 3555447 A1 | 10/2019 |
| EP | 3557009 A1 | 10/2019 |
| EP | 3557010 A1 | 10/2019 |
| EP | 3561263 A1 | 10/2019 |
| EP | 3054128 B1 | 11/2019 |
| EP | 3565987 | 11/2019 |
| EP | 3565987 A1 | 11/2019 |
| EP | 3567283 | 11/2019 |
| EP | 3567283 A1 | 11/2019 |
| EP | 2540989 B1 | 12/2019 |
| EP | 3283369 B1 | 12/2019 |
| EP | 2943670 B1 | 1/2020 |
| EP | 3059387 B1 | 1/2020 |
| EP | 3339610 B1 | 1/2020 |
| EP | 3597884 A1 | 1/2020 |
| EP | 3159578 B1 | 2/2020 |
| FR | 3069020 B1 | 8/2019 |
| GB | 2351121 | 12/2000 |
| JP | 06556157 B2 | 8/2019 |
| WO | 2017198999 A1 | 11/2017 |

OTHER PUBLICATIONS

A New Approach to Turboshaft Engine Growth, M. A. Compagnon, General Electric Company, Lynn, Massachusetts pp. 80-41-1 to 80-41-6, May 13, 1980.

European Search Report, EP20164853.2, dated Jun. 5, 2020.

European Search Report, EP18156221.6, dated Jul. 5, 2018.

Office Action, U.S. Appl. No. 16/360,297, dated Sep. 28, 2020.

Office Action, U.S. Appl. No. 16/360,297, dated Mar. 30, 2021.

* cited by examiner

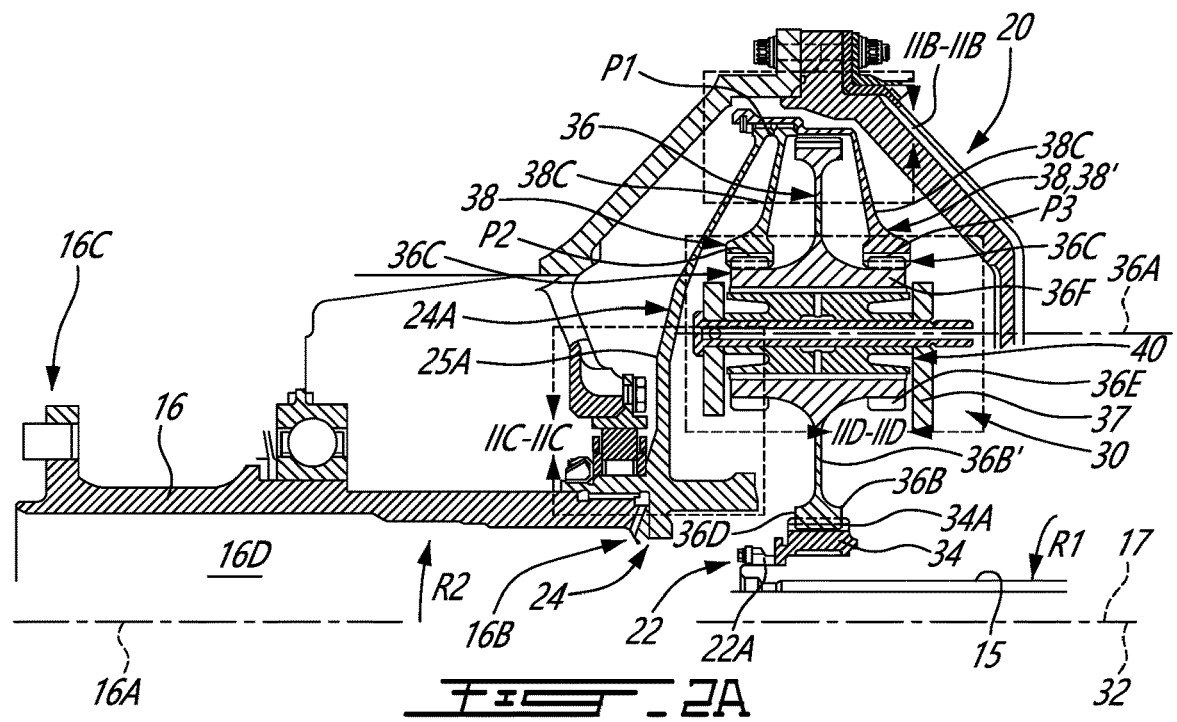
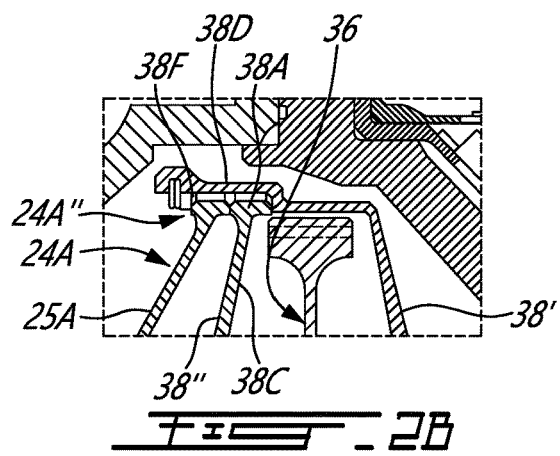
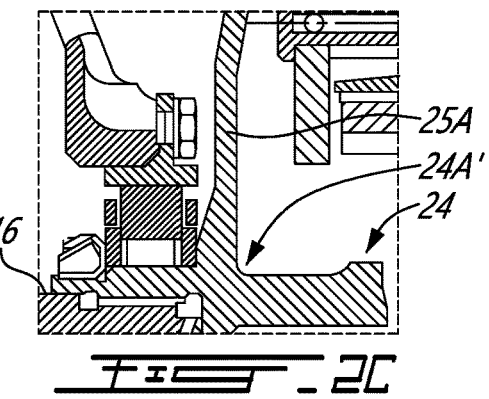
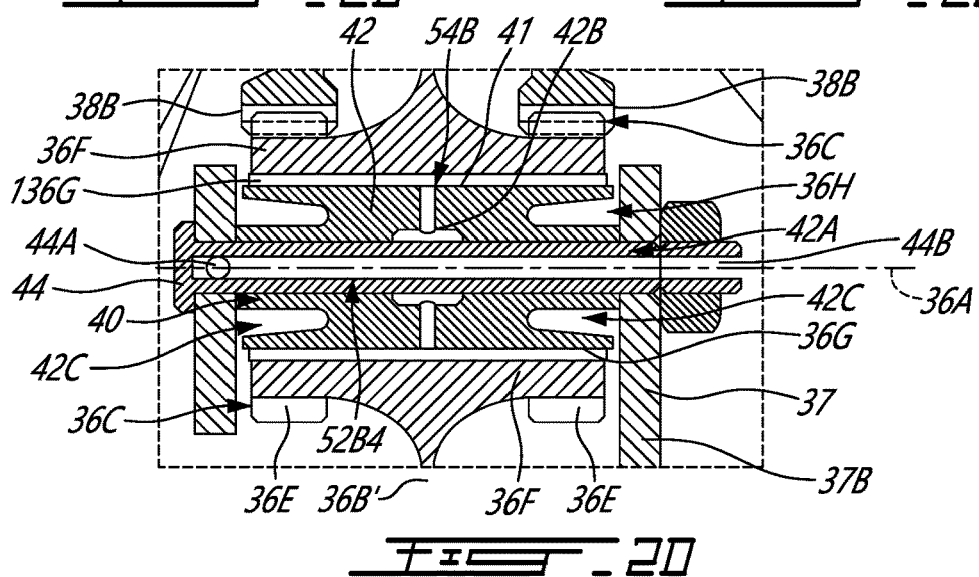
FIG. 2A
FIG. 2B
FIG. 2C
FIG. 2D

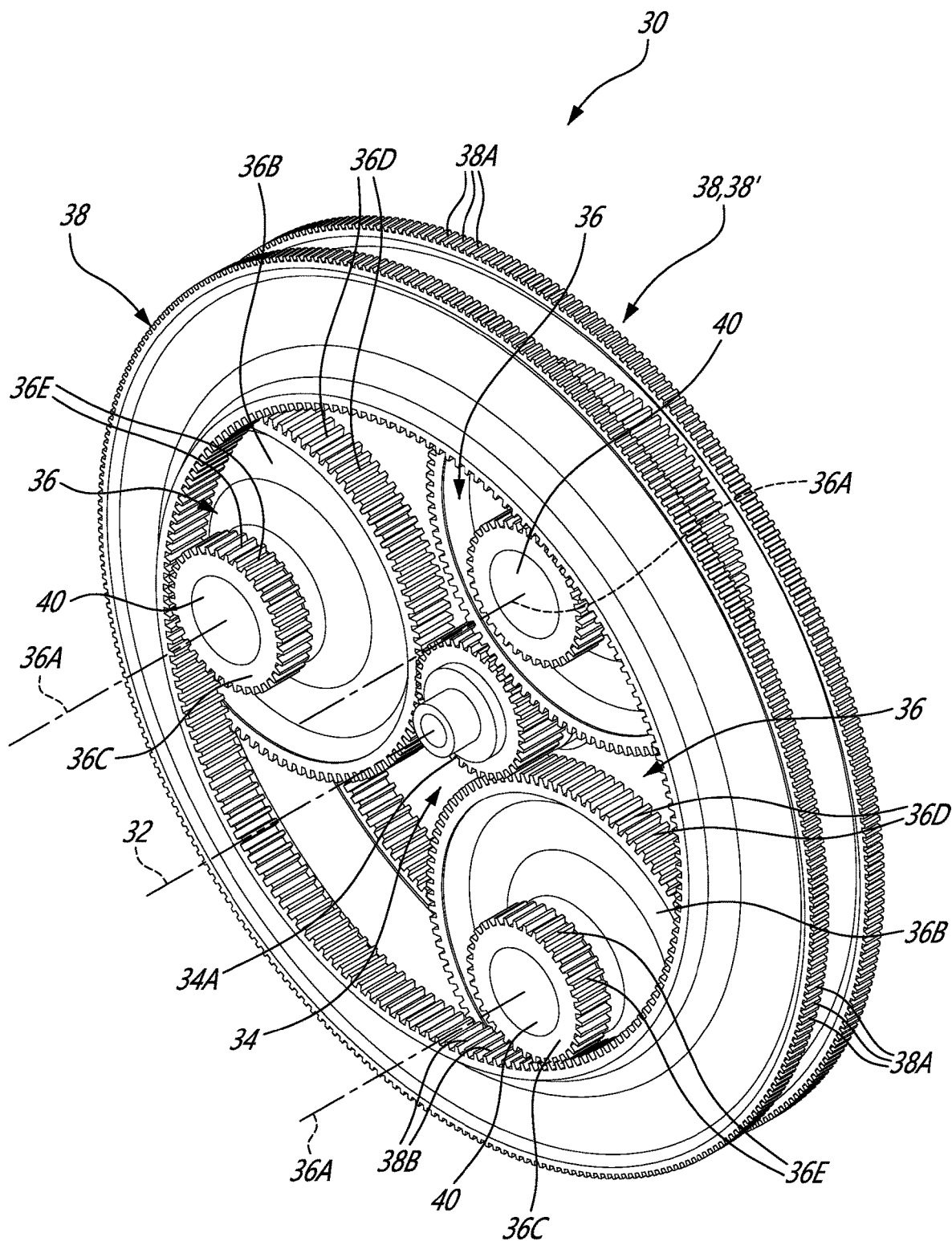

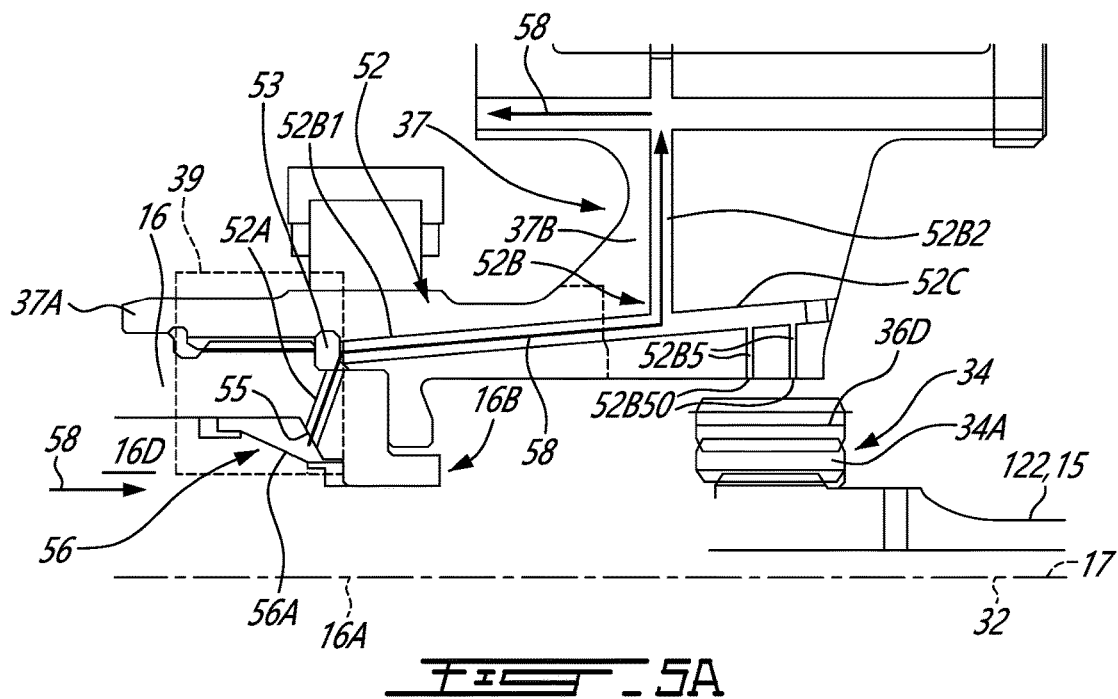
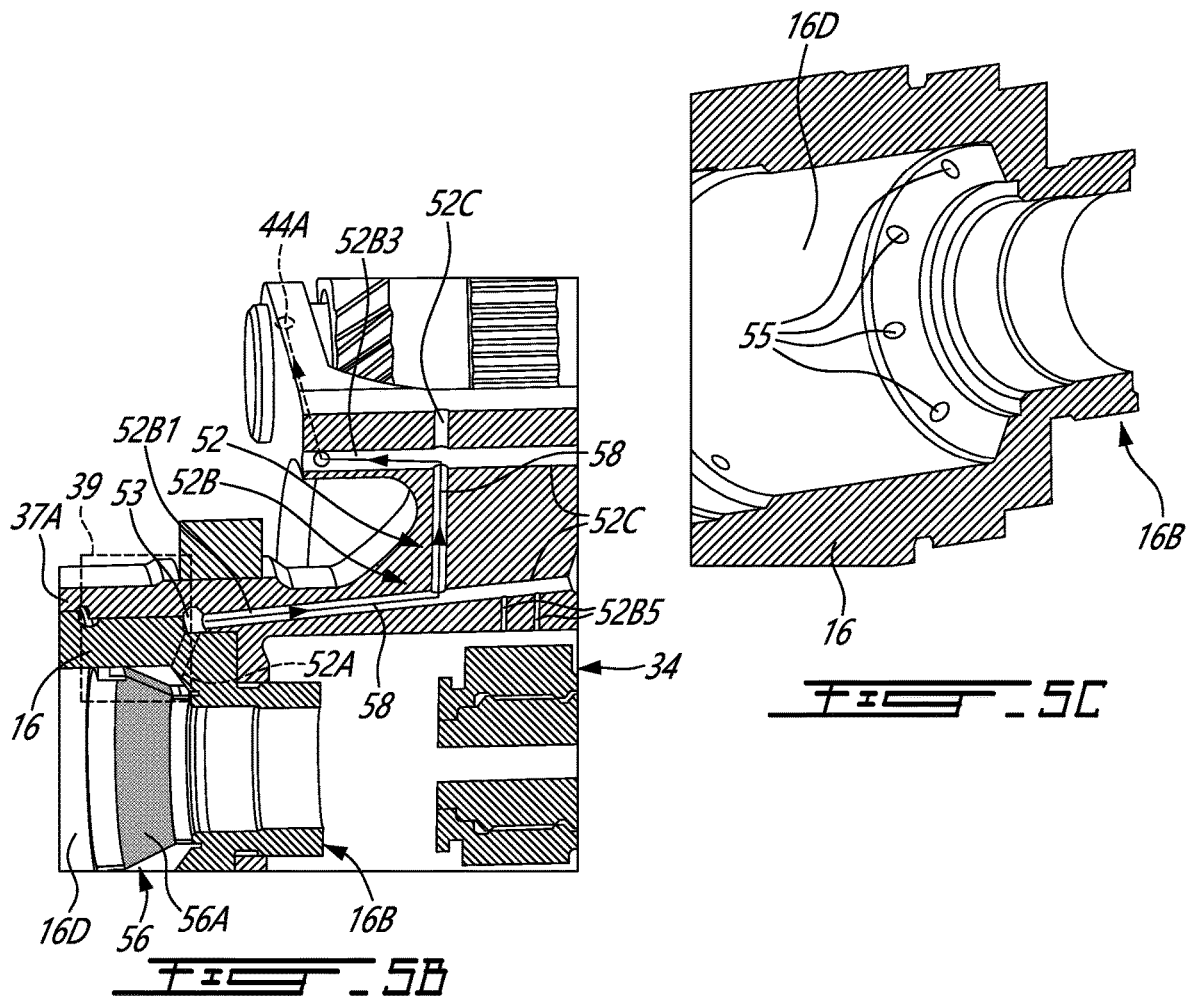

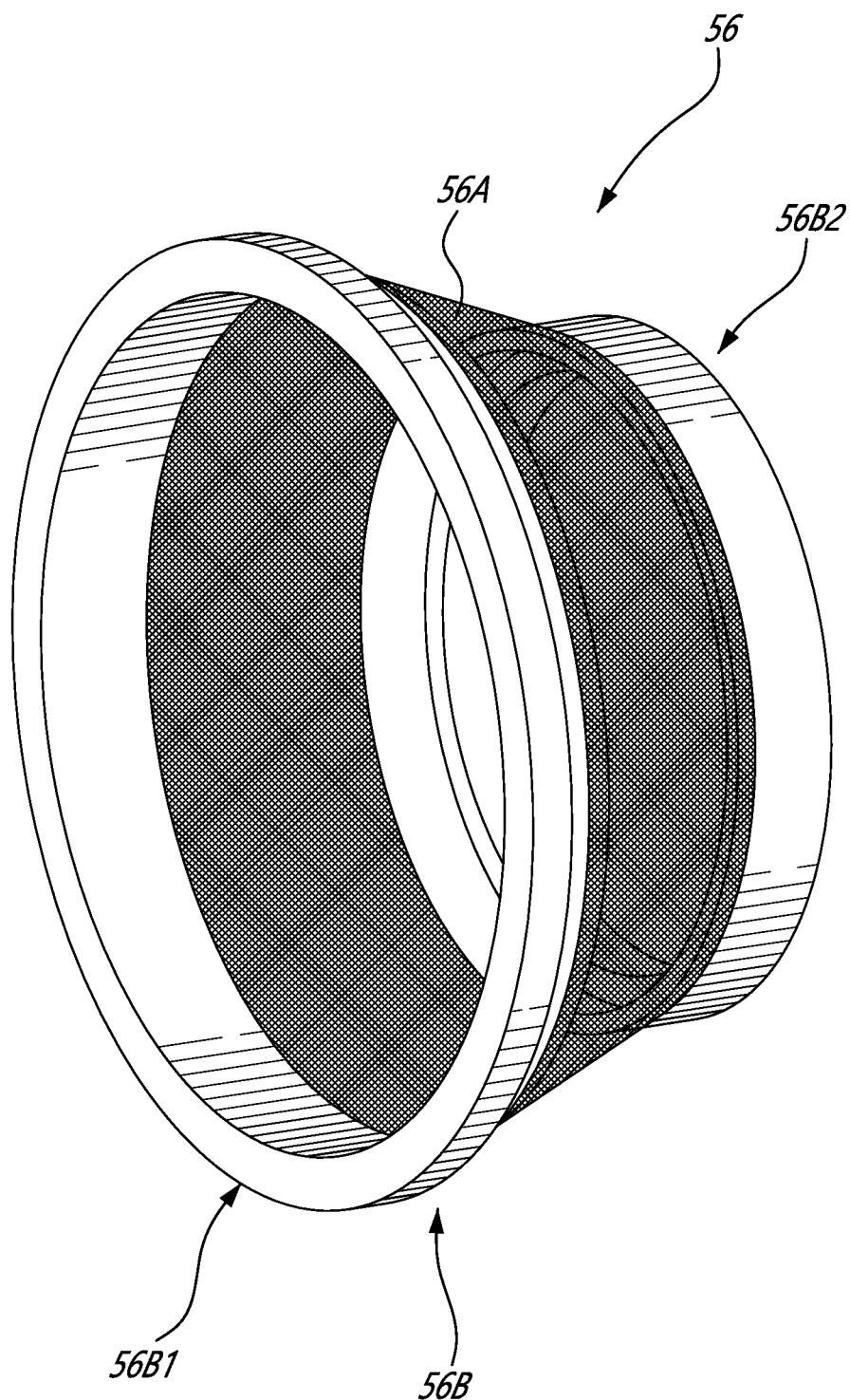

```
┌─────────────────────────────────────────────────────────────┐
│ Filtering a lubricant at a location where the carrier engages │
│           an output of the aircraft engine                    │
└─────────────────────────────────────────────────────────────┘
                              │
┌─────────────────────────────────────────────────────────────┐
│ Lubricating interfaces between the planet gears and the      │
│          carrier with the filtered lubricant                  │
└─────────────────────────────────────────────────────────────┘
```

FIG. 7

```
┌─────────────────────────────────────────────────────────────┐
│ Removing the propeller shaft of the engine to form an axially│
│  and radially extending access volume at the center of the   │
│                         engine                                │
└─────────────────────────────────────────────────────────────┘
                              │
┌─────────────────────────────────────────────────────────────┐
│ Performing maintenance on a lubricant strainer mounted at    │
│       the carrier-output engagement location                  │
└─────────────────────────────────────────────────────────────┘
                              ┆
┌┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┐
┆   Not disassembling the epicyclic gear train of the engine  ┆
└┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┘
                              ┆
┌┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┐
┆              Removing a casing for the RGB                  ┆
└┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┘
```

FIG. 8

LUBRICATION SYSTEM FOR AIRCRAFT ENGINE REDUCTION GEARBOX

CROSS-REFERENCE TO RELATED APPLICATIONS

Reference is made to U.S. patent application Ser. No. 16/360,297 filed Mar. 21, 2019, the entire contents of which are incorporated by reference herein.

TECHNICAL FIELD

The application relates generally to aircraft engines and, more particularly, to aircraft engines with reduction gearboxes.

BACKGROUND

Aircraft engines may include a reduction gearbox (RGB) which provides a speed reduction while carrying the torque increase at lower speed.

RGBs contribute to the weight, cost and size of the engine, and may also impose oil flow requirements for lubrication and cooling, which in turn impact the oil system components of the engine.

SUMMARY

There is disclosed a gas turbine engine, comprising: a power input and a power output; and an epicyclic gear train engaged with the power input and with the power output, the epicyclic gear train comprising: a sun gear defining a center axis and engaged with the power input; a plurality of planet gears mounted to a carrier and engaged to the sun gear, the plurality of planet gears rotatable about respective planet gear axes, the plurality of planet gears and the carrier rotatable about the center axis, the carrier engaged with the power output at a carrier-output engagement location; one or more ring gears in meshed engagement with the plurality of planet gears; a plurality of planet gear bearings, each planet gear bearing disposed between one of the plurality of planet gears and the carrier, a lubrication interface defined between each planet gear bearing and the one of the plurality of planet gears; and a bearing lubrication system including a lubricant supply conduit extending between a conduit inlet at the carrier-output engagement location and conduit outlets at the lubrication interfaces of the plurality of planet gear bearings, the bearing lubrication system including a lubricant strainer mounted about the conduit inlet at the carrier-output engagement location.

There is disclosed a method of operating a reduction gearbox of an aircraft engine, the reduction gearbox having an epicyclic gear train with a sun gear, planet gears mounted to a carrier, and one or more ring gears, the method comprising: filtering a lubricant at a location where the carrier engages an output of the aircraft engine; and lubricating interfaces between the planet gears and the carrier with the filtered lubricant.

There is disclosed a gas turbine engine, comprising: a power input and a power output; and an epicyclic gear train engaged with the power input and with the power output, the epicyclic gear train comprising: a sun gear defining a center axis and engaged with the power input; a plurality of planet gears mounted to a carrier and engaged to the sun gear, the plurality of planet gears rotatable about respective planet gear axes; one or more ring gears in meshed engagement with the plurality of planet gears and rotatable about the center axis, the one or more ring gears engaged with the power output at an engagement location; a plurality of planet gear bearings, each planet gear bearing disposed between one of the plurality of planet gears and the carrier, a lubrication interface defined between each planet gear bearing and the one of the plurality of planet gears; and a bearing lubrication system including a lubricant supply conduit extending between a conduit inlet at the engagement location and conduit outlets at the lubrication interfaces of the plurality of planet gear bearings, the bearing lubrication system including a lubricant strainer mounted about the conduit inlet at the engagement location.

DESCRIPTION OF THE DRAWINGS

Reference is now made to the accompanying figures in which:

FIG. 2A is a cross-sectional view of part of a reduction gearbox of the gas turbine engine in FIG. 1;

FIG. 2B is an enlarged view of area IIB-IIB in FIG. 2A;

FIG. 2C is an enlarged view of area IIC-IIC in FIG. 2A;

FIG. 2D is an enlarged view of area IID-IID in FIG. 2A;

FIG. 3 is a perspective view of an epicyclic gear train of the reduction gearbox of FIG. 2A;

FIG. 5A is a partial cross-sectional view of the part of the reduction gearbox of FIG. 4A;

FIG. 5B is an enlarged perspective view of an output shaft of FIG. 5A;

FIG. 5C is another partial cross-sectional view of the part of the reduction gearbox of FIG. 4A;

FIG. 6 is a perspective view of a lubricant strainer of FIG. 5A;

FIG. 7 is a graphical representation of a disclosed method; and

FIG. 8 is another graphical representation of a disclosed method.

DETAILED DESCRIPTION

Figure 1:
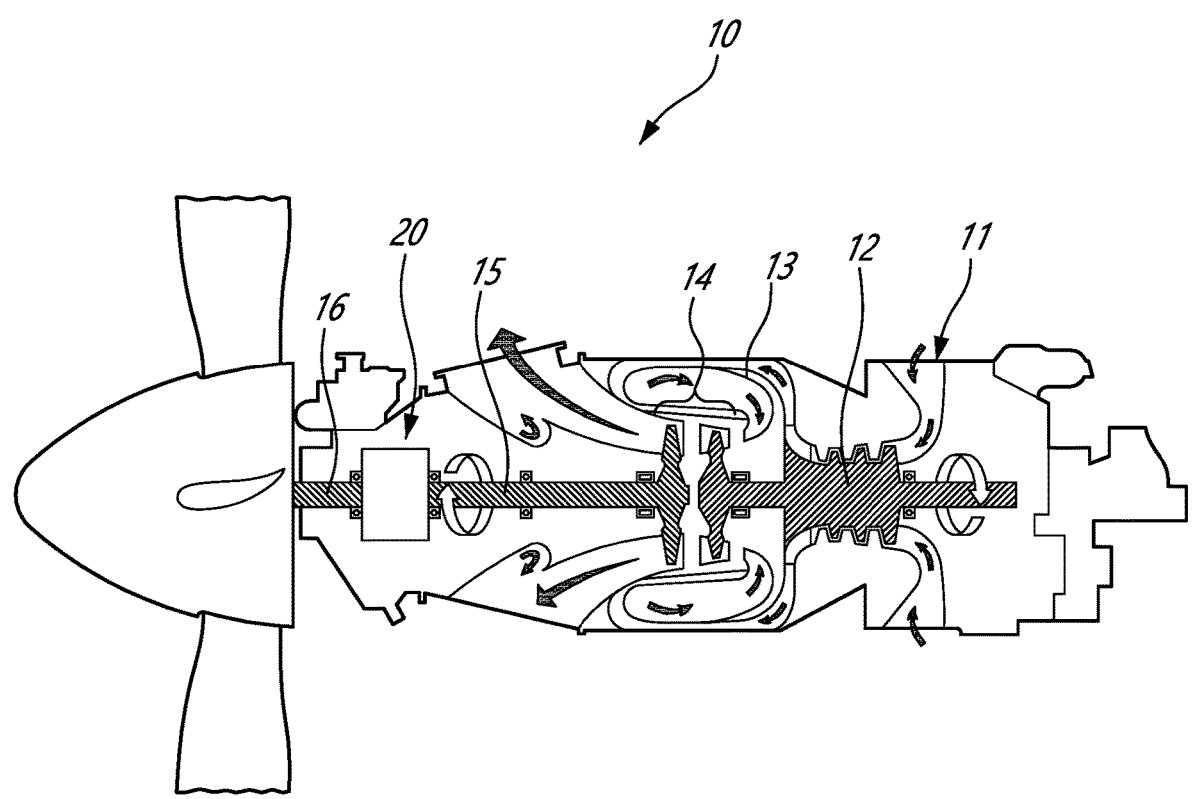
FIG. 1 is a schematic cross-sectional view of a gas turbine engine.

FIG. 1 illustrates a gas turbine engine 10 commonly referred to as a "turboprop", and of a type preferably provided for use in subsonic flights, generally comprising in serial flow communication an intake 11 through which air is drawn to subsequently be compressed by compressors 12. Fuel is added to the compressed air in a combustor 13 for the combustion of the fuel and air mixture. Combustion gasses then expand to drive turbines 14. A power shaft 15 connected to one of the turbines 14 projects to transmit a rotatable driving force to a propeller shaft 16. Although the engine 10 shown in FIG. 1A is configured for driving a propeller of an aircraft, the engine 10 in an alternate embodiment is a turboshaft engine configured to drive the rotor of a helicopter, or the fan of a "turbofan" engine. Any suitable engine may be employed.

The engine 10 has a transmission, including a reduction gearbox 20, engaged with the power and propeller shafts 15,16. The reduction gearbox 20 (sometimes referred to herein as "RGB 20") allows for the controlled application of power from the power shaft 15 to the propeller shaft 16. As will be explained in greater detail below, the RGB 20 includes gears, gear trains, and other gear arrangements to provide speed and torque conversions from the rotating power and propeller shafts 15,16.

Referring to FIG. 2A, the RGB 20 has a power input 22 and a power output 24. The power input 22 and the power output 24 are both rotatable about a longitudinal center axis 17 of the engine 10. The power input 22 is any mechanical object or coupling which links the RGB 20 to a power source of the engine 10 and through which motive power is provided to the RGB 20. The power output 24 is any mechanical object or coupling which links the RGB 20 to a driven component of the engine 10 and through which motive power is conveyed from the RGB 20. The power output 24 is a rotatable driven member that functions to drive a rotatable load such as the propeller of an aircraft, the rotor of a helicopter, a fan of the engine, or the reduction gearboxes associated with the aircraft propeller and helicopter rotor. For example, in FIG. 2A, the power input 22 includes a coupling 22A mounted to the power shaft 15 to receive a rotational input therefrom, and the power output 24 includes a spline 24A mounted to the propeller shaft 16 to convey thereto a torque output of the RGB 20. In FIG. 2A, the coupling 22A and the spline 24A are rotatable and coaxial about the center axis 17 of the engine 10 and axially spaced apart from each other. In alternate embodiments, the power input 22 and the power output 24 are radially offset. In an alternate embodiment, the power input 22 is embodied as a gearing arrangement which is engaged to, and driven by, the power shaft 15. In the depicted embodiment, the power output 24 is the sole or single source of power for the main load of the engine 10, namely, the propeller, the rotor, or their respective reduction gearboxes. The power output 24 in the depicted embodiment is therefore the only power output to drive the propeller, the rotor, or their respective reduction gearboxes.

Referring to FIG. 2A, the engine 10 has an output shaft, which is the propeller shaft 16 in the illustrated embodiment. The propeller shaft 16 defines, and is rotatable about, an output shaft axis 16A. The output shaft axis 16A is parallel to the center axis 17 of the engine 10. The output shaft axis 16A may be collinear with the center axis 17 of the engine 10. The propeller shaft 16 extends axially between a first end 16B of the propeller shaft 16 that is engaged to the power output 24 of the RGB 20, and a second end 16C that is spaced axially apart from the first end 16B. The second end 16C is spaced axially apart from the first end 16B in a direction away from the RGB 20. The second end 16C may be engaged directly with the propeller, or indirectly with the propeller via a propeller gearbox. The first end 16B is the portion of the propeller shaft 16 that is spaced axially furthest from the propeller. The propeller shaft 16 is a hollow annular body that defines an inner volume or shaft interior 16D. Referring to FIG. 2A, the propeller shaft 16 is hollow along its entire axial length between the first and second ends 16B,16C, such that the shaft interior 16D extends axially between the first and second ends 16B,16C. In an alternate embodiment, the output shaft of the engine 10 is another shaft, and may be another rotatable load such as the rotor of a helicopter, a fan of the engine 10, or the reduction gearboxes associated with the aircraft propeller and helicopter rotor.

Referring to FIG. 2A, the RGB 20 also includes an epicyclic gear train 30. The epicyclic gear train 30, which in the depicted embodiment is a "planet" type gear train, is engaged with the power input 22 to be driven thereby, and is engaged with the power output 24 to drive the power output 24. By "engaged", it is understood that the rotation of components of the epicyclic gear train 30 allows power from the power input 22 to be transferred to the power output 24.

In FIG. 2A, the epicyclic gear train 30 is the only epicyclic gear train of the RGB 20. In FIG. 2A, the epicyclic gear train 30 is the only epicyclic gear train positioned between the power input 22 of the RGB 20 and the power output 24 of the RGB 20. In FIG. 2A, only one epicyclic gear train 30 engages both the power input 22 of the RGB 20 and the power output 24. The RGB 20 is therefore a "single stage" RGB 20, and uses only one epicyclic gear train 30 to achieve speed reduction and torque conversion. In contrast, some conventional reduction gearboxes have multiple epicyclic gear systems, which may be arranged in series such that the output of one of the epicyclic gear systems is the input for another of the epicyclic gear systems, in order to achieve the desired speed reduction and torque conversion. The use of multiple epicyclic gear systems may create weight and space penalties.

The epicyclic gear train 30 includes a sun gear 34. The sun gear 34 is centrally disposed in the epicyclic gear train 30, and defines a center axis 32 of the epicyclic gear train 30. The center axis 32 in FIG. 2A is collinear with the center axis 17 of the engine 10. The outer circumferential periphery of the sun gear 34 is located closer to the center axis 32 of the epicyclic gear train 30 than all other rotating components of the epicyclic gear train 30. The sun gear 34 is engaged with the power input 22 to be driven thereby about the center axis 32. In FIG. 2A, the sun gear 34 is coupled to the coupling 22A of power input 22 to receive rotational input from the power shaft 15. The sun gear 34 has sun gear teeth 34A. As shown in FIG. 2A, the power input 22 is coaxial with the sun gear 34.

The epicyclic gear train 30 also has multiple compound planet gears 36 which mesh with the sun gear 34, and are driven thereby. The compound planet gears 36 mesh with the inside of ring gears 38 of the epicyclic gear train 30. The compound planet gears 36 therefore mesh with both the sun gear 34 and the ring gears 38. The compound planet gears 36 are mounted to a carrier 37 which extends between and connects the center of the compound planet gears 36. Each compound planet gear 36 is rotatable about its own planet gear axis 36A. In FIG. 2A, the planet gear axes 36A are radially spaced apart from center axis 32. The planet gear axes 36A are parallel to each other, and to the center axis 32. It will therefore be appreciated that the power provided by the sun gear 34 to the compound planet gears 36 may cause them to rotate about themselves and their planet gear axes 36A.

Each compound planet gear 36 includes differently-sized gear engaging elements for engaging different components of the epicyclic gear train 30. Each compound planet gear 36 may thus be referred to as a "stepped-planet" gear. The presence of the compound planet gears 36 may allow the RGB 20 to achieve the desired speed reduction and torque conversion using only the single epicyclic gear train 30 shown in FIG. 2A, thus avoiding the need for two stages of epicyclic gear reduction. Each compound planet gear 36 includes an input gear 36B and output gears 36C. Each input and output gear 36B,36C is a portion of the compound planet gear 36 with teeth, splines, or other similar elements which mesh with the teeth of another gear separate from the same compound planet gear 36. The input and output gears 36B,36C are coaxial and concentric.

The input gear 36B is in meshed engagement with the sun gear 34 to receive a rotational drive from the sun gear 34, thereby causing the compound planet gear 36 to rotate about its planet gear axis 36A. In FIG. 2A, the sun gear teeth 34A are meshed with the input gear teeth 36D of each compound planet gear 36 to transmit rotation from the sun gear 34 to the compound planet gears 36. The output gears 36C are spaced from the input gear 36B along the direction of the planet gear axis 36A. The output gears 36C are axially spaced apart from each other. The input gear 36B is positioned axially between the output gears 36C along the direction of the planet gear axis 36A. The compound planet gear 36 shown in FIG. 2A has two output gears 36C, but more are possible.

For the compound planet gear 36 shown in FIG. 2A, the input gear 36B is positioned axially between the output gears 36C. The output gears 36C are thus positioned on the compound planet gear 36 on opposite axial sides of the input gear 36B. The two output gears 36C are axially spaced equidistantly from the input gear 36B. A diameter of the input gear 36B is greater than a diameter of the output gears 36C. The radial distance of the input gear teeth 36D from the planet gear axis 36A is greater than the radial distance of output gear teeth 36E of the output gears 36C from the planet gear axis 36A. This arrangement of the differently-sized gears 36B,36C may help achieve speed reduction and torque conversion in a relatively compact volume, as described in greater detail below. The output gears 36C in FIG. 2A have the same diameter. The input and output gears 36B,36C are rigidly connected together and rotate at the same rotational speed about the planet gear axis 36A. The input and output gears 36B,36C are integral with one another. Each compound planet gear 36 in the depicted embodiment is a unitary structure. Each compound planet gear 36 in the depicted embodiment is a single-piece structure or a single part. Each compound planet gear 36 in the depicted embodiment includes a pair of concentric output gears 36C rigidly connected to each side of the larger input gear 36B. Such a compound planet gear 36 may offer an additional speed reduction when compared to a conventional star-type gear system which does not have compound planet gears.

Each compound planet gear 36 may have any suitable structure with the input and output gears 36B,36C, an example of which is described with reference to FIGS. 2A and 2D. The compound planet gears 36 have a central body 36F or shaft being coaxial with the planet gear axis 36A. The central body 36F is annular, and hollow along at least part of its axial length. Referring to FIG. 2D, an inner journal surface 36G of the body 36F delimits a central cavity 36H of the body 36F which is also coaxial with the planet gear axis 36A. Referring to FIG. 2A, the input gear 36B includes an input gear web 36B' extending radially outwardly from the body 36F to a peripheral end having the input gear teeth 36D. The output gears 36C are positioned at axially opposite ends of the body 36F, and include the output gear teeth 36E. Other structures and arrangement of components for the compound planet gear 36 are possible.

Still referring to FIG. 2A, the ring gears 38 are axially spaced apart from each another along the direction of the center axis 32 of the epicyclic gear train 30. The ring gears 38 are rotatable about the center axis 32. The ring gears 38 are engaged, directly or indirectly, with the power output 24 to transmit the torque and reduced speed from the RGB 20 to a component to be driven, such as the propeller shaft 16. FIG. 2A shows two ring gears 38, but more may be used, the number of ring gears 38 typically corresponding to the number of output gears 36B.

The ring gears 38 receive a rotational input from the compound planet gears 36. Each ring gear 38 is in meshed engagement with one of the output gears 36C. It will thus be appreciated that the input gears 36B of the compound planet gears 36 receive a rotational input from the sun gear 34, and the output gears 36C of the compound planet gears 36 output a rotational input to the ring gears 38. The epicyclic gear train 30 in FIG. 2A is thus an epicyclic star gear system having compound planet gears 36 with concentric gears 36B,36C, and axially spaced-apart output ring gears 38 engaging the axially spaced-apart sets of the output gear teeth 36E of the compound planet gears 36. The epicyclic gear train 30 with its arrangement of compound planet gears 36 engaging different ring gears 38 may provide an additional speed reduction when compared to a conventional star type gear system.

One possible configuration for the ring gears 38 is shown in FIGS. 2A, 2B and 2D. Each ring gear 38 includes an outer meshing member 38A engaged with the power output 24 (see FIG. 2B), and an inner meshing member 38B disposed radially inwardly of the outer meshing member 38A and in meshed engagement with one of the output gears 36C (see FIG. 2D). The inner meshing member 38B includes teeth, splines, etc. meshed with the output gear teeth 36E to receive a rotational input from the output gears 36C. The ring gears 38 in FIG. 2A are annular bodies with radially outer and inner meshing members 38A,38B. Each ring gear 38 in FIG. 2A includes a ring gear web 38C extending radially between the outer and inner meshing members 38A,38B. The outer and inner meshing members 38A,38B of each ring gear 38 are axially offset from one another. Other configurations for the ring gears 38 are possible.

The ring gears 38 in the illustrated embodiment indirectly engage the power output 24. The spline 24A of the power output 24 extends between the power shaft 16 and the ring gears 38, so as to convey a rotational output from the ring gears 38 to the power shaft 16. The spline 24A is a rotatable, annular component having a first end 24A' coupled to the propeller shaft 16 and a radially-outer second end 24A" in meshed engagement with the ring gears 38 (see FIGS. 2A, 2B and 2C). The second end 24A" of the spline 24A is in meshed engagement with the outer meshing members 38A of the ring gears 38. In FIG. 2A, the ring gears 38 are separate gears that are axially spaced apart from each other, and which are connected by the common spline 24, so that the ring gears 38 and the spline 24A rotate together about the center axis 32 of the epicyclic gear train 30 and output to the propeller shaft 16. As shown in FIG. 2A, the spline 24 is in meshed engagement with the ring gears 38 at a first axial position P1 that is axially spaced from axial positions P2,P3 of the meshed engagement of the ring gears 38 with the output gears 36C. In FIG. 2A, the first axial position P1 is located axially between the axial positions P2,P3 of the meshed engagement of the inner meshing members 38B with the output gear teeth 36E of the output gears 36C. The axially-spaced apart ring gears 38 thus have a common output location that is axially offset from where the ring gears 38 are engaged to the output gears 36C.

The spline 24A and ring gears 38 may have any suitable meshing structure to achieve the functionality described above. For example, and referring to FIGS. 2A, 2B and 2C, the spline 24A has a spline web 25A extending between the first and second ends 24A',24A". Referring to FIG. 2B, one of the ring gears 38' has an axial extension 38D at the radially outer end which has an orientation being substantially parallel to the center axis 32. The axial extension 38D extends from a first end at the radially outer end of the ring gear 38' to a second end which includes the teeth 38F of the outer meshing member 38A. The teeth 38F of the ring gear 38' mesh with the teeth of the second end 24A" of the spline 24A, and with the teeth of the other ring gear 38", such that the rotation of both the ring gears 38', 38" drives the rotation of the spline 24A about the center axis 32. In an alternate embodiment, the ring gears 38 directly engage the power output 24 to provide a rotational output thereto.

One possible manner for operating the epicyclic gear train 30 is now described with reference to FIG. 2A. The sun gear 34 is engaged, via the coupling 22A, with the power input 22 to be driven thereby. The carrier 37 is fixed and made immobile, such that it does not rotate about the center axis 32. The carrier 37 can be fixed in place by, among other things, being mounted to surrounding structure or by using a brake of the epicyclic gear train 30. Since the carrier 37 is fixed in place, the compound planet gears 36 are prevented from rotating about the center axis 32. The rotational input provided by the sun gear 34 to the input gears 36B of the compound planet gears 36 causes the compound planet gears 36 to rotate about their respective planet gear axes 36A. The rotation of the output gears 36C of the compound planet gears 36 in turn causes the meshed ring gears 38 to rotate about the center axis 32. The ring gears 38 in the depicted embodiment engage the power output 24 via the spline 24A to rotate the propeller shaft 16. The epicyclic gear train 30 in the depicted embodiment may therefore be referred to as a "star" gear system, in which the carrier 37 is braked to slow and/or stop rotation thereof, while the compound planet gears 36 can still rotate about each of their respective axis 36A. The compound planet gears 36 in such a star gear configuration thus do not revolve around the sun gear 34 (i.e. the axes 36A of rotation of each compound planet gear 36 is fixed in space), but the compound planet gears 36 still individually rotate. It is possible to operate the gear train 30 differently than as described above. For example, reference is made to U.S. patent application Ser. No. 16/360,297 which describes an arrangement of the epicyclic gear train 30 which operates as a "star"-type gear system where the carrier 37 is immobile and where the ring gears rotate about the center axis 32.

Still referring to FIG. 2A, the sun gear 34 is driven in a first rotational direction R1 about the center axis 32, and the star type arrangement of the compound planet gears 36 means that they will cause the ring gears 38, and thus the power output 24 and the propeller shaft 16, to rotate in a second rotational direction R2 opposite to the first rotational direction R1. The epicyclic gear train 30 of FIG. 2A therefore reverses the rotation direction of the output relative to the input. In contrast, in a conventional planetary type gear system, the ring gear is normally fixed in place, and the planet gears rotate about their own axes and about the axis of the planetary gear system, such that the rotational direction of the input is the same as the rotational direction of the output.

Referring to FIGS. 2A and 2D, each of the compound planet gears 36 is mounted about an oil-film bearing 40. The bearing 40 is fixed to surrounding support structure, such as the casing or the carrier 37, so that it does not displace during rotation of the compound planet gears 36 about their respective planet gear axes 36A. The bearings 40 are coaxial with each of the compound planet gears 36 about their planet gear axes 36A. In the illustrated embodiment, the bearings 40 are journal or rotary bearings, which support the compound planet gears 36 during their rotation. In FIGS. 2A and 2D, the oil-film bearing 40 is mounted within the central cavity 36H of the annular body 36F of each compound planet gear 36, and releases a thin film of oil or other suitable fluid along the inner journal surface 36G of the body 36F for lubrication. The oil-film bearing 40 may help the arrangement of the compound planet gears 36 in the epicyclic gear train 30 to occupy less space or volume.

Thus the axial spacing apart of the output gears 36C allows for the "split" ring gears 38 shown in FIG. 2A, where both are disposed symmetrically on each axial side of the bearings 40, so that load is applied uniformly through the planetary gear axes 36A, and load asymmetry may be avoided. The epicyclic gear train 30 is thus an arrangement of a star epicyclic system, combining compound planet gears 36 and oil film bearing 40 with balanced load from two ring gears 38. This contrasts with some conventional planetary gear systems, in which an unequal planet radial load is applied longitudinally.

FIG. 3 is a perspective view of the epicyclic gear train 30 showing the sun gear 34, the compound planet gears 36, and the ring gears 38. The carrier 37 is omitted from FIG. 3 for clarity. The sun gear teeth 34A are meshed with the input gear teeth 36D of the input gear 36B of each of the compound planet gears 36 to transmit rotation from the sun gear 34 to the compound planet gears 36. The inner meshing members 38B of the ring gears 38 are meshed with the output gear teeth 36E of the output gears 36C of each of the compound planet gears 36 to receive a rotational input from the output gears 36C in one possible embodiment of the epicyclic gear train 30. In another embodiment of the epicyclic gear train 30 described below, the inner meshing members 38B of the ring gears 38 are meshed with the output gear teeth 36E of the output gears 36C of each of the compound planet gears 36 so that the compound planet gears 36 can displace along the inner meshing members 38B of the ring gears 38. The outer meshing members 38A of the ring gears 38 are shown. In FIG. 3, the ring gear 38' is shown without the axial extension 38D for clarity. Each compound planet gear 36 is mounted about the oil-film bearing 40.

Referring to FIG. 2A, there is also disclosed a method of operating the RGB 20. The method includes driving the sun gear 34 to rotate the input gear 36B of the compound planet gears 36, and to rotate the axially spaced-apart output gears 36C. Rotation of the output gears 36C rotates the ring gears 38 about the center axis 32 of the epicyclic gear train 30.

Figure 4:
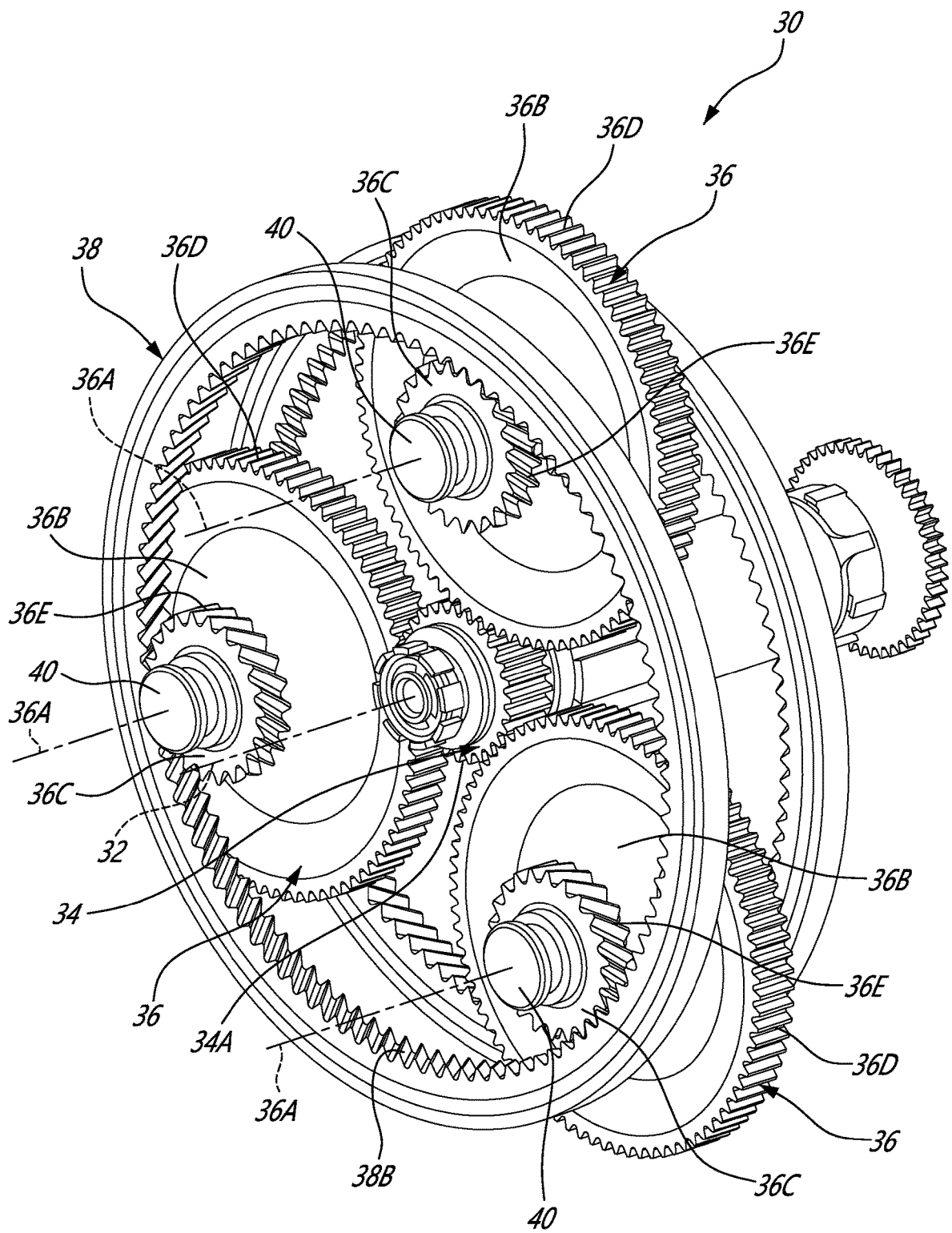
FIG. 4 is a perspective view of an epicyclic gear train of a reduction gearbox of the gas turbine engine in FIG. 1.

Another possible configuration of the epicyclic gear train 30 is now described with reference to FIG. 4. The description of the epicyclic gear train 30 in FIGS. 2A-3 applies mutatis mutandis to the description of the epicyclic gear train 30 in FIG. 4. Any features, functionalities or advantages attributed to the epicyclic gear train 30 or its components in FIGS. 2A-3 applies mutatis mutandis to the epicyclic gear train 30 in FIG. 4. Reference numbers indicated in FIGS. 1-3 are applicable to similar elements shown in FIG. 4. FIG. 4 is a perspective view of the epicyclic gear train 30 showing the sun gear 34, the compound planet gears 36, and the ring gears 38. The carrier 37 is omitted from FIG. 4 for clarity. The sun gear teeth 34A are meshed with the input gear teeth 36D of the input gear 36B of each of the compound planet gears 36 to transmit rotation from the sun gear 34 to the compound planet gears 36. The inner meshing members 38B of the ring gears 38 are meshed with the output gear teeth 36E of the output gears 36C of each of the compound planet gears 36 so that the compound planet gears 36 can displace along the inner meshing members 38B of the ring gears 38.

Another possible configuration of the RGB 20 having the epicyclic gear train 30 of FIG. 4 is now described with reference to FIGS. 4A to 8. The description of the RGB 20 in FIGS. 2A-3 applies mutatis mutandis to the description of the RGB 20 in FIGS. 4A to 8. Any features, functionalities or advantages attributed to the RGB 20 or its components in FIGS. 2A-3 applies mutatis mutandis to the RGB 20 in FIGS. 4A to 8. Reference numbers indicated in FIGS. 1-3 are applicable to similar elements shown in FIGS. 4A to 8.

Figure 4A:
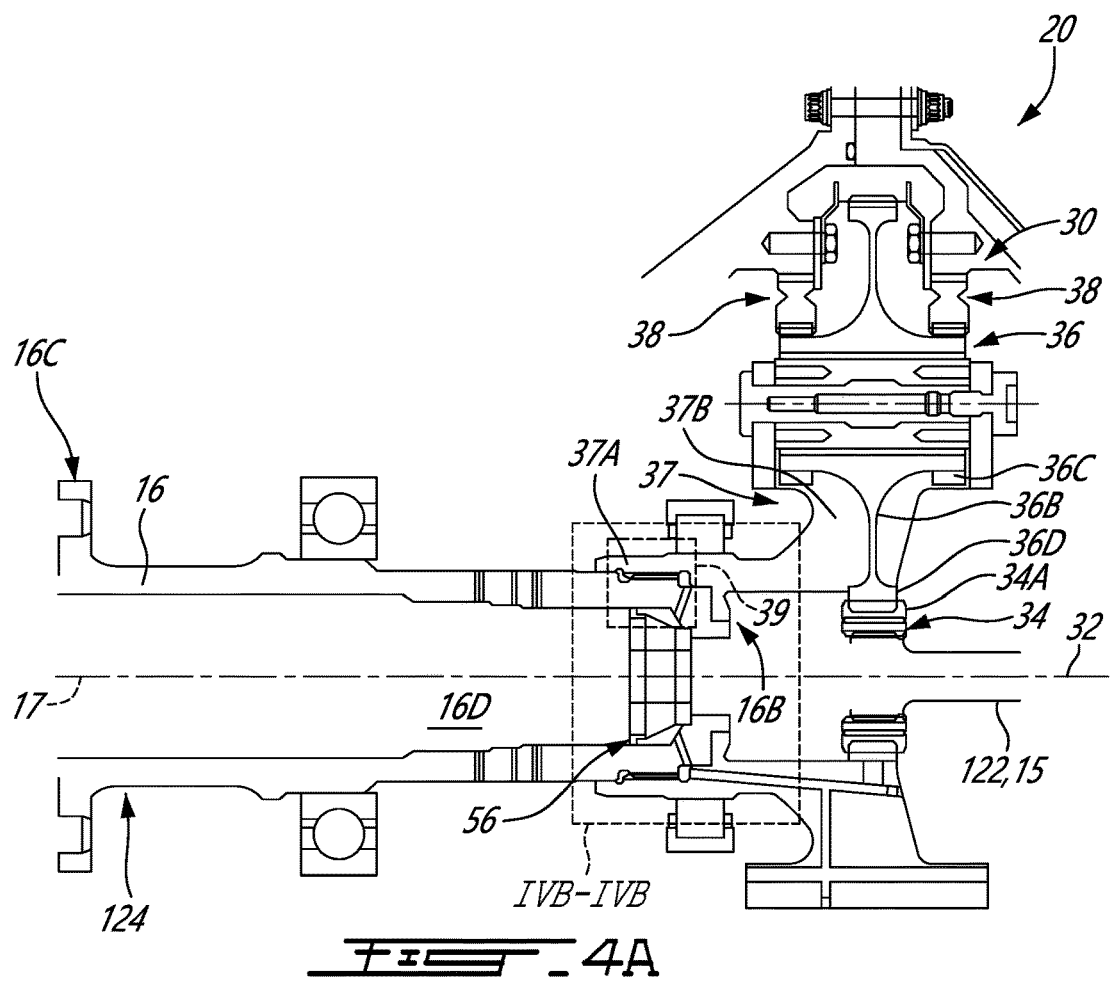
FIG. 4A is a cross-sectional view of part of a reduction gearbox of the gas turbine engine in FIG. 1, having the epicyclic gear train of FIG. 4.

Referring to FIG. 4A, the RGB 20 is engaged to both the power input 122 and the power output 124 of the engine 10. The power input 122 and the power output 124 are both rotatable about the longitudinal center axis 17 of the engine 10. The power input 122 is any mechanical object or coupling which links the RGB 20 to a power source of the engine 10 and through which motive power is provided to the RGB 20. The power output 124 is any mechanical object or coupling which links the RGB 20 to a driven component of the engine 10 and through which motive power is conveyed from the RGB 20. The power output 124 is a rotatable driven member that functions to drive a rotatable load such as the propeller of an aircraft, the rotor of a helicopter, a fan of the engine, or the reduction gearboxes associated with the aircraft propeller and helicopter rotor. For example, in FIG. 4A, the power input 122 is, or is mounted to, the power shaft 15 to receive a rotational input therefrom. For example, in FIG. 4A, the power output 124 is an output shaft of the engine 10. For example, in FIG. 4A, the power output 124 is, or includes, an output shaft such as the propeller shaft 16 to convey thereto a torque output of the RGB 20. In an alternate embodiment, the power input 122 is embodied as a gearing arrangement which is engaged to, and driven by, the power shaft 15. In the depicted embodiment, the power output 124 is the sole or single source of power for the main load of the engine 10, namely, the propeller. The power output 124 in the depicted embodiment is therefore the only power output to drive the propeller.

Referring to FIG. 4A, the epicyclic gear train 30 of the RGB 20, which in the depicted embodiment is a "planet" type gear train, is engaged with the power input 122 to be driven thereby, and is engaged with the power output 124 to drive the propeller shaft 16. By "engaged", it is understood that the rotation of components of the epicyclic gear train 30 allows power from the power input 122 to be transferred to the propeller shaft 16.

Referring to FIG. 4A, the sun gear 34 is engaged with the power input 122 to be driven thereby about the center axis 32. In FIG. 4A, the sun gear 34 is coupled to the power shaft 15 to receive rotational input from the power shaft 15. The sun gear 34 has sun gear teeth 34A which mesh with the input gear teeth 36D of each compound planet gear 36. In another possible configuration, a spline rotatably couples the sun gear 34 to the compound planet gears 36.

The ring gears 38 are axially spaced apart from each another along the direction of the center axis 32 of the epicyclic gear train 30. In the epicyclic gear train 30 of FIG. 4A, the ring gears 38 are fixed in position. In the epicyclic gear train 30 of FIG. 4A, the ring gears 38 do not rotate about the center axis 32 of the epicyclic gear train 30. FIG. 4A shows two ring gears 38, but more may be used, the number of ring gears 38 typically corresponding to the number of output gears 36C of each compound planet gear 36. The inner meshing members 38B of each ring gear 38 is in meshed engagement with the output gear teeth 36E of the output gears 36C (see FIG. 4). The ring gears 38 in FIG. 4A are annular bodies with radially inner meshing members 38B. Other configurations for the ring gears 38 are possible.

The compound planet gears 36 rotate along the inner meshing members 38B of the ring gears 38 about the center axis 32. It will thus be appreciated that the input gears 36B of the compound planet gears 36 receive a rotational input from the sun gear 34, and the output gears 36C of the compound planet gears 36 circumferentially displace along inner teeth of the ring gears 38 about the center axis 32. The epicyclic gear train 30 in FIG. 4A is thus an epicyclic "planet" gear system having compound planet gears 36 with concentric gears 36B,36C, and axially spaced-apart ring gears 38 engaging the axially spaced-apart sets of the output gear teeth 36E of the compound planet gears 36.

The compound planet gears 36 are mounted to a carrier 37 which extends between and connects the center of the compound planet gears 36. The compound planet gears 36 and the carrier 37 rotate about the center axis 32 of the epicyclic gear train 30. More specifically, the rotational input provided by the sun gear 34 to the compound planet gears 36 causes them to drive the carrier 37 to rotate with the compound planet gears 36 about the sun gear 34 and about the center axis 32. The carrier 37 is engaged, directly or indirectly, with the power output 124 to transmit the torque and reduced speed from the RGB 20 to a component to be driven, which in FIG. 4A, is the propeller shaft 16. The carrier 37 and the propeller shaft 16 rotate together, such that there is no slip between the carrier 37 and the propeller shaft 16.

Referring to FIG. 4A, the carrier 37 is an annular body. The carrier 37 includes a carrier output shaft 37A that is meshed with the propeller shaft 16. The carrier output shaft 37A directly engages the first end 16B of the propeller shaft 16 so as to convey a rotational output from the compound planet gears 36 to the propeller shaft 16. The carrier output shaft 37A is an annular body that is coaxial with, and rotates about, the center axis 32. The carrier output shaft 37A has an axial length defined along the center axis 32. The carrier output shaft 37A is axially positioned between the sun gear 34 and the second end 16C of the propeller shaft 16. The carrier 37 includes multiple carrier arms 37B which extend radially outwardly from the carrier output shaft 37A to the compound planet gears 36. The carrier arms 37B are spaced circumferentially from each other about the center axis 32. The number of carrier arms 37B corresponds to the number of compound planet gears 36. In the illustrated embodiment, there are three carrier arms 37B. The carrier output shaft 37A is engaged with propeller shaft 16 so that the carrier 37 is able to transmit torque to the propeller shaft 16 and thus drive the propeller.

Figure 4B:
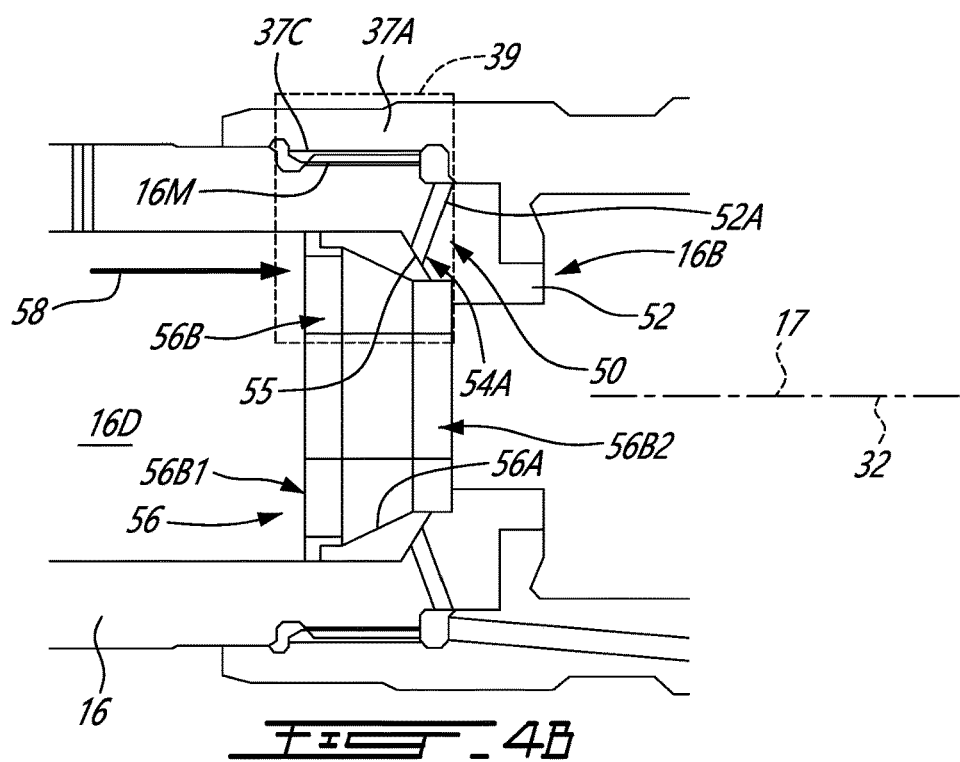
FIG. 4B is an enlarged view of area IVB-IVB in FIG. 4A.

Referring to FIGS. 4A and 4B, the carrier 37 engages the propeller shaft 16 at an interface between the two components. More particularly, the carrier output shaft 37A has carrier output meshing members 37C, which may be gear teeth or spline teeth, along a radially inner wall of the carrier output shaft 37A. The carrier output meshing members 37C mesh with propeller input meshing members 16M on a radially outer wall of the propeller shaft 16 and its first end 16B, to convey a rotational output from the carrier output shaft 37A to the propeller shaft 16. The carrier 37 is thus engaged with the propeller shaft 16 at a carrier-output engagement location 39. The carrier-output engagement location 39 is an area or region within the engine 10 at which the drive from the carrier 37 is transmitted to the first end 16B of the propeller shaft 16. Referring to FIGS. 4A and 4B, the carrier-output engagement location 39 is located along the longitudinal center axis 17 of the engine 10 at a position that is axially between the sun gear 34 and the second end 16C of the propeller shaft 16. Referring to FIGS. 4A and 4B, the carrier-output engagement location 39 is located along the longitudinal center axis 17 of the engine 10 at a position that is axially between the sun gear 34 and a mid-axial span position of the propeller shaft 16. Referring to FIGS. 4A and 4B, the carrier-output engagement location 39 is located along the longitudinal center axis 17 of the engine 10 at a position that is axially adjacent to the first end 16B of the propeller shaft 16. Referring to FIGS. 4A and 4B, the carrier-output engagement location 39 is located relative to the longitudinal center axis 17 of the engine 10 at a position that is radially inward of the output gears 36C of the compound planet gears 36. Referring to FIGS. 4A and 4B, the carrier-output engagement location 39 is located relative to the longitudinal center axis 17 of the engine 10 at a position that is radially inward of the radially-outermost surface of the carrier output shaft 37A. Referring to FIGS. 4A and 4B, the carrier-output engagement location 39 is composed of, or includes, the carrier output shaft 37A and the first end 16B of the propeller shaft 16.

Referring to FIG. 2D, the central body 36F of each compound planet gear 36 is annular, and hollow along at least part of its axial length. A journal 136G or sleeve is an annular body that extends along a circumferential inner surface of the central body 36F and about the planet gear axis 36A, and delimits the central cavity 36H of the body 36F which is also coaxial with the planet gear axis 36A. The journal 136G defines the inner journal surface 36G. The journal 136G and the central body 36F rotate together (i.e. no slip) about the planet gear axis 36A. The oil-film bearing 40 is positioned within the central cavity 36H. Each of the bearings 40 are located between one of the compound planet gears 36 and the carrier 37. Since the bearings 40 support the rotation of the compound planet gears 36, they are sometimes referred to herein as "planet gear bearings 40".

Referring to FIG. 2D, each bearing 40 is fixed to surrounding support structure, such as to a radially-outer end of one of the carrier arms 37B of the carrier 37, so that it does not displace about the planet gear axis 36A during rotation of the compound planet gears 36 about their respective planet gear axes 36A. The bearings 40 are coaxial with each of the compound planet gears 36 about their planet gear axes 36A. In the illustrated embodiment, the bearings 40 are journal or rotary bearings, which support the compound planet gears 36 during their rotation. Referring to FIG. 2D, each of the bearings 40 includes a bearing shaft 42 positioned within the central cavity 36H about the planet gear axis 36A. The bearing shaft 42 is engaged directly with the journal 136G and disposed within the journal 136G. The bearing shaft 42 is an annular body which defines a bearing shaft interior 42A that is coaxial with the planet gear axis 36A. Each bearing shaft 42 has an annular groove 42C at its axially outer ends. The annular groove 42C is coaxial with the planet gear axis 36A and extends axially inwardly into the body of the bearing shaft 42. The bearing shaft 42 in FIG. 2D is thus a compliant shaft having axially outer ends which permit more deflection in a radial direction at both ends due to the structural compliance added by the annular grooves 42C. Each bearing shaft 42, and each bearing 40 itself, is secured to one of the carrier arms 37B with a bolt 44 that extends through the bearing shaft interior 42A and through axially opposed ends of the carrier arm 37B. The bolt 44 rotates with the bearing shaft 42 (i.e. no slip) and the carrier 37 about the center axis 32, such that the bolts 44 and the bearing shafts 42 are "stationary" with respect to the compound planet gears 36.

The oil-film bearing 40 releases a thin film of oil or other suitable lubricant along the radially-inner surface 36G of the journal 136G. The radially-inner surface 36G of the journal 136G therefore forms a lubrication interface 41 between the bearing 40 and the compound planet gear 36, which is lubricated to allow the compound planet gear 36 and the journal 136G to rotate relative to, and about, the bearing 40 and about the planet gear axis 36A. The lubrication interface 41 is a radial gap between radially opposed surfaces, that is much smaller in magnitude than the radial dimensions of the components it is defined between. In FIG. 2D, the radial gap of the lubrication interface 41 is defined between an inner diameter of the journal 136G and an outer diameter of the bearing shaft 42. The lubrication interface 41 in FIG. 2D extends along most or all of the axial extent of the journal 136G and the bearing shaft 42. In an alternate embodiment, the lubrication interface 41 is along a radially-inner surface of the central body 36F of the compound planet gear 36, such that bearing shaft 42 directly supports the compound planet gear 36 (e.g. the journal sleeve 136G is omitted from the assembly), which may require some surface treatment of the planet gear 36 internal diameter such as a coating.

One possible manner for operating the epicyclic gear train 30 is now described with reference to FIGS. 4A and 4B. The sun gear 34 is engaged to the power shaft 15 to be driven thereby. The ring gears 38 are fixed and made immobile, such that they do not rotate about the center axis 32. The ring gears 38 may be fixed in place by, among other things, being mounted to surrounding structure or by using a brake of the epicyclic gear train 30. Since the ring gears 38 are fixed in place, the compound planet gears 36 rotate about the center axis 32. The rotational input provided by the sun gear 34 to the input gears 36B of the compound planet gears 36 causes the compound planet gears 36 to rotate about their respective planet gear axes 36A and about the center axis 32. The rotation of the compound planet gears 36 about the center axis 32 in turn causes the carrier arms 37B and the carrier output shaft 37A to rotate about the center axis 32. The carrier output meshing members 37C of the carrier output shaft 37A engage the propeller input meshing members 16M at the first end 16B of the propeller shaft 16 to provide the output of the epicyclic gear train 30 and rotate the propeller shaft 16. The epicyclic gear train 30 in the depicted embodiment may therefore be referred to as a "planetary" gear system, in which the ring gears 38 are braked to slow and/or stop rotation thereof, while the compound planet gears 36 and the carrier 37 rotate about the center axis 32. The compound planet gears 36 in such a planetary gear configuration thus revolve around the sun gear 34 (i.e. the axes 36A of rotation of each compound planet gear 36 rotates about the center axis 32). It is possible to operate the gear train 30 differently than as described above. For example, reference is made to U.S. patent application Ser. No. 16/360,297 which describes an arrangement of the epicyclic gear train 30 which operates as a "star"-type gear system where the carrier 37 is immobile and where the ring gears rotate about the center axis 32, the entirety of which is incorporated by reference herein. The rotational direction of the input of the epicyclic gear train 30 is the same as the rotational direction of the output epicyclic gear train 30.

Referring to FIGS. 4A and 4B, a bearing lubrication system 50 is now described in greater detail. The bearing lubrication system 50 is a grouping of components which form part of the RGB 20 to supply a lubricant, such as oil, to the oil film bearings 40, and possibly other components of the RGB 20 requiring lubrication. In one possible operating mode for the epicyclic gear train 30, the bearings 40 are constantly fed with pressurized oil to continuously lubricate the lubrication interfaces 41, so as to support rotation of the compound planet gears 36 about their planet gear axes 36A.

The bearing lubrication system 50 includes a lubricant supply conduit 52 to convey the lubricant to the lubrication interfaces 41. More particularly, and as explained in greater detail below, the lubricant supply conduit 52 allows the lubricant to be conveyed from the carrier-output engagement location 39 to the lubrication interfaces 41 for each compound planet gear 36. During operation of the engine 10, the lubricant supply conduit 52 defines a lubricant flow path, along which the lubricant is supplied under pressure into a conduit inlet 54A of the lubricant supply conduit 52 and travels along the lubricant flow path of the lubricant supply conduit 52 to multiple conduit outlets 54B that are in fluid communication with the lubrication interfaces 41 (see FIG. 2D). The lubricant supply conduit 52 may therefore be any suitable object, or take any suitable form, to achieve such functionality. As described in greater detail below, the lubricant supply conduit 52 includes interconnected through passages that extend through components of the epicyclic gear train 30. The lubricant supply conduit 52 may also or alternatively include external tubes, pipes, lines or other fluid-enclosing bodies running along the outside of one or more components of the epicyclic gear train 30.

Referring to FIGS. 4A and 4B, the conduit inlet 54A is any suitable opening, passage or volume which admits lubricant into the lubricant supply conduit 52. The conduit inlet 54A is positioned at the carrier-output engagement location 39. By "at", it is understood that the conduit inlet 54A is located in the immediate vicinity of where the carrier output shaft 37A engages the first end 16B of the propeller shaft 16. This may be expressed in different forms. For example, in one possible configuration, such as the one shown in FIG. 4B, the conduit inlet 54A is positioned immediately radially inwardly of the location where the carrier output meshing members 37C of the carrier output shaft 37A engage the propeller input meshing members 16M at the first end 16B of the propeller shaft 16. In another possible configuration, the conduit inlet 54A is positioned immediately axially adjacent to the location where the carrier output shaft 37A engages the first end 16B of the propeller shaft 16. In another possible configuration, the conduit inlet 54A is positioned in the same location, or collocated, where the carrier output shaft 37A engages the first end 16B of the propeller shaft 16. Referring to FIGS. 4A and 2D, each of the conduit outlets 54B supplies the lubricant to one of the lubrication interfaces 41. The conduit outlets 54B therefore define, or are in fluid communication with, the lubrication interfaces 41.

Referring to FIGS. 4A and 4B, the bearing lubrication system 50 includes a lubricant strainer 56. The lubricant strainer 56 is a filter, sieve or other similar device of any suitable size and density to remove solid or semisolid debris from the lubricant while allowing passage of the lubricant through the lubricant strainer 56, before the lubricant is conveyed, via the conduit inlet 54A, into the lubricant supply conduit 52. The lubricant strainer 56 thus prevents any undesirable solid debris from being entrained with the lubricant to the lubrication interfaces 41. The lubricant strainer 56 therefore helps prevent or reduce debris from entering the bearing 40, where such debris might otherwise cause overheating, damage and/or failure of the bearing 40.

Referring to FIG. 4B, the lubricant strainer 56 is mounted about the conduit inlet 54A. By "about", it is understood that the lubricant strainer 56 is mounted in relation to the conduit inlet 54A such that the lubricant strainer 56 is positioned upstream of the conduit inlet 54, so that the lubricant must first travel through the lubricant strainer 56 before entering the conduit inlet 54A. Different configurations of this mounting are possible. For example, and referring to FIGS. 4B and 5C, the conduit inlet 54A includes one or more openings 55 in the propeller shaft 16. The openings 55 are circumferentially spaced apart from each other along the inner annular wall of the propeller shaft 16 that delimits the shaft interior 16D (see FIG. 5C). The lubricant strainer 56 covers or overlaps the openings 55 to filter the lubricant upstream of the openings 55 by forcing the lubricant to transit through the lubricant strainer 56 before going into the openings 55. The lubricant strainer 56 has a mesh 56A which is spaced apart from the openings 55. The mesh 56A is spaced apart radially inwardly from the openings 55. The mesh 56A has a frusto-conical shape. The lubricant strainer 56 is a singular body. The lubricant strainer 56 is only one of the parts of the engine 10. In another possible configuration, the lubricant strainer 56 is mounted closer or further to the conduit inlet 54A. In another possible configuration, the lubricant strainer 56 is a cylindrical mesh. In another possible configuration, the lubricant strainer 56 is a disc-shaped axial flow membrane.

Referring to FIGS. 4A and 4B, the lubricant strainer 56 is positioned within the shaft interior 16D and protects the openings 55 from potential debris in the lubricant. In FIGS. 4A and 4B, only one lubricant strainer 56 is positioned within the shaft interior 16D. The lubricant strainer 56 in the illustrated embodiment has an annular body 56B that is coaxial with the longitudinal center axis 17 of the engine 10. Referring to FIGS. 4B and 6, the annular body 56B has an axial extent, and extends between a first end 56B1 and a second end 56B2. When the lubricant strainer 56 is mounted at the carrier-output engagement location 39, the first end 56B1 is axially closer to the propeller than the second end 56B2. The diameter of the annular body 56B is greater at the first end 56B1 than at the second end 56B2. The annular body 56B has a frusto-conical shape. The first and second ends 56B1,56B2 are defined by rings of different diameter each of which supports the mesh 56A. The first and second ends 56B1,56B2 are mounted to any suitable portion of the inner annular wall of the propeller shaft 16 that defines the shaft interior 16D so that the lubricant strainer 56 rotates with the propeller shaft 16 about the longitudinal center axis 17. In an alternate embodiment, the lubricant strainer 56 is not annular or does not include the annular body 56B. In an alternate embodiment, the conduit inlet 54A is along an outer wall of the carrier output shaft 37A at the carrier-output engagement location 39, and the lubricant strainer 56 is mounted about the carrier output shaft 37A like a sleeve so that the mesh 56A covers the conduit inlet 54A.

The lubricant strainer 56 is located at the carrier-output engagement location 39. By "at", it is understood that the lubricant strainer 56 is located in the immediate vicinity of where the carrier output shaft 37A engages the first end 16B of the propeller shaft 16. This may be expressed in different forms. For example, in one possible configuration, such as the one shown in FIG. 4B, the lubricant strainer 56 is positioned immediately radially inwardly of the location where the carrier output meshing members 37C of the carrier output shaft 37A engage the propeller input meshing members 16M at the first end 16B of the propeller shaft 16. In another possible configuration, the lubricant strainer 56 is positioned immediately axially adjacent to the location where the carrier output shaft 37A engages the first end 16B of the propeller shaft 16. In another possible configuration, the lubricant strainer 56 is positioned in the same location, or collocated, where the carrier output shaft 37A engages the first end 16B of the propeller shaft 16.

In some configurations of the components of the epicyclic gear train 30, size constraints or the arrangement of the components may make it difficult or impossible to filter the lubricant within the RGB 20 at, or immediately prior to, the lubrication interfaces 41. Thus, placing the lubricant strainer 56 at the inlet 54A of the lubricant supply conduit 52 allows for filtering any debris and preventing it from entering the lubricant supply conduit 52 before the lubricant gets to the lubrication interfaces 41. Placing the lubricant strainer 56 at the carrier-output engagement location 39 provides a "last chance" for filtering the lubricant before it enters the small and difficult-to-access portions of the lubricant supply conduit 52 that lead to the lubrication interfaces 41. Thus, the position of the lubricant strainer 56 at the carrier-output engagement location 39 helps to prevent comprising the reliability of the bearing 40 or the lubrication feed system. Furthermore, the position of the lubricant strainer 56 at the carrier-output engagement location 39 may facilitate maintenance, cleaning, replacement, inspection, or repair of the lubricant strainer 56, because the lubricant strainer 56 may be easily accessed during maintenance of engine 10 by removing the propeller shaft 16 to create an axially and radially extending access volume to an interior of the carrier shaft 37A. Further, by removing the propeller, access is provided to the lubricant strainer 56 via the interior of the propeller shaft 16 in one possible configuration of the lubricant strainer 56. There may thus be no need to disassemble the whole epicyclic gear train 30 to access the lubricant strainer 56 because it is positioned at the carrier-output engagement location 39.

Positioning the lubricant strainer 56 at the carrier-output engagement location 39 helps to locate the lubricant strainer 56 as close as possible to the lubrication interfaces 41 without being within the components of the epicyclic gear train 30, and removes any design requirement for the bearings 40 or the body 36F of the compound planet gears 36 to filter the lubricant. This allows the bearings 40 and the compound planet gears 36 to be optimized for their primary load carrying function, rather than for lubricant filtration, and contributes to a stable and compact design for the bearings 40 allowing high power/weight ratio and reliability. This also provides more options when selecting the size and shape of the lubricant strainer 56 for a given epicyclic gear train 30. By using a single lubricant strain 56 is some configurations upstream of the lubrication interfaces 41, it is possible to avoid using multiple filters within the compound planetary gears 36 and thus reduce the engine part count.

In an alternate embodiment, the lubricant strainer 56 is positioned at another location of the epicyclic gear train 30. For example, in the configuration of the RGB 20 where the epicyclic gear train 30 is a "star" type gear train as described above, the lubricant strainer 56 is positioned at a location where the rotatable output from the ring gear 38 engages an output shaft like the propeller shaft 16.

Referring to FIGS. 5A to 5C, the lubricant supply conduit 52 is described in greater detail. In the depicted configuration, the lubricant supply conduit 52 includes interconnected through passages that extend through components of the epicyclic gear train 30. The lubricant supply conduit 52 includes multiple first segments 52A that are through passages through the annular body of the propeller shaft 16. Each first segment 52A extends radially outwardly from one of the openings 55 and is in fluid communication with the shaft interior 16D. The orientation of each first segment 52A is radial to the longitudinal center axis 17, and is inclined relative to a radial line by an angle greater than 0 degrees and less than 90 degrees. The lubricant supply conduit 52 includes multiple second segments 52B downstream of the first segments 52A and in fluid communication with the first segments 52A to receive the lubricant therefrom. The second segments 52B are through passages through the body of the carrier 37, and extend downstream from the first segments 52A through the carrier 37 to the conduit outlets 54B at the lubrication interfaces 41. The lubricant supply conduit 52 is thus formed of interconnected passages through the propeller shaft 16 and through the carrier 37 to ultimately deliver the lubricant to the bearings 40 and the interfaces 41.

Referring to FIGS. 5A to 5C, each of the second segments 52B includes multiple portions. A first portion 52B1 of each second segment 52B extends substantially axially (i.e. an axial vector of the first portion 52B1 is greater in magnitude than a radial vector) through the carrier output shaft 37A from the corresponding first segment 52A. The upstream end of the first portion 52B1 of the second segments 52B and the downstream end of the first segments 52A meet at an annular lubricant cavity 53 defined between a radially-inner surface of the carrier output shaft 37A and a radially-outer surface of the propeller shaft 16. The annular lubricant cavity 53 may form a manifold for collecting the previously-filtered lubricant from the openings 55. A second portion 52B2 of each second segment 52B extends substantially radially (i.e. a radial vector of the second portion 52B2 is greater in magnitude than an axial vector) through each of the carrier arms 37B from the first portion 52B1. A third portion 52B3 of each second segment 52B extends through one of the carrier arm 37B toward the planet gear bearing 40. A fourth portion 52B4 of each second segment 52B is defined within the planet gear bearing 40. The fourth portion 52B4 extends through the bolt 44 and through the bearing shaft 42 and is in fluid communication with the third portion 52B3. Referring to FIG. 2D, the fourth portion 52B4 has an upstream end defined by an opening 44A in the bolt 44 which is in fluid communication with the third portion 52B3. The fourth portion 52B4 extends along an inner passage 44B of the bolt 44, and provides the lubricant to a radially-extending bearing shaft passage 42B extending through the bearing shaft 42. Each bearing shaft passage 42B terminates at, and is in fluid communication with, the lubrication interface 41 to supply the lubricant to the lubrication interface 41. The fourth portion 52B4 may be referred to herein as a "planet gear passage 52B4" because it allows lubricant to be supplied to lubricate the rotation of the compound planet gear 36. Referring to FIGS. 5A and 5B, the carrier arms 37B include one or more machining passages 52C which are used to form, or to facilitate, the creation of the portions 52B1, 52B2, 52B3, 52B4 of the second segment 52B. The machining passages 52C may be partially or fully filled in once the machining operation has been completed. Although the first and second segments 52A,52B may be described above using singular language, it will be appreciated that the lubricant supply conduit 52 includes multiple pairs of the first and second segments 52A,52B, where each pair of the first and second segments 52A,52B may be circumferentially spaced apart from another pair. Referring to FIGS. 5A and 5B, the second segment 52B of the lubricant supply conduit 52 includes multiple sun gear passages 52B5, each of which terminates at one or more sun gear passage outlets 52B50 to lubricate an engagement between the compound planet gears 36 and the sun gear 34. Each of the sun gear passages 52B5 is a spur line extending from the first portion 52B1 of the second segment 52B, downstream of the location where the second portion 52B2 of the second segment 52B intersects the first portion 52B1. Each of the sun gear passages 52B5 has a substantially radial orientation relative to the center axis 32. The sun gear passage outlets 52B50 are spaced apart radially inwardly of the first portions 52B1.

During operation of the engine 10, the flow of a lubricant 58 along the lubricant flow path defined by the lubricant supply conduit 52 may be described as follows with reference to FIGS. 5A to 5C. The lubricant 58 is supplied under pressure to the shaft interior 16D of the propeller shaft 16 and travels in an axial direction through the shaft interior 16D toward the lubricant strainer 56. The lubricant 58 is then conveyed under pressure through the mesh 56A of the lubricant strainer 56 which filters the lubricant 58 by removing debris which may be entrained in the lubricant 58. Once the lubricant 58 is screened or filtered by the mesh 56A, it enters the openings 55 in the propeller shaft 16 at the conduit inlet 54A. The lubricant 58 is then conveyed through the first segments 52A of the lubricant supply conduit 52 in a radially outward direction. The lubricant 58 is then conveyed through the second segments 52B of the lubricant supply conduit 52. More particularly, the lubricant 58 is conveyed along the first portions 52B1, then the second portions 52B2, then the third portions 52B3 and then into the opening 44A of the fourth portions 52B4 of the second segments 52B. Referring to FIG. 2D, from the opening 44A, the lubricant 58 is conveyed along the inner passage 44B of the bolt 44, and through the radially-extending bearing shaft passage 42B extending through the bearing shaft 42. The lubricant 58 then arrives at the lubrication interfaces 41 to supply the lubricant to the lubrication interfaces 41. During conveyance of the lubricant 58 to the lubrication interfaces 41, the propeller shaft 16, the carrier output shaft 37A, and the carrier arms 37B are rotating about one or more of the axes 16A,17,32.

Referring to FIGS. 5A to 5C and 7, there is disclosed a method of operating the RGB 20. The method includes filtering the lubricant 58 at a location 39 where the carrier 37 engages an output 16 of the aircraft engine 10. The method includes lubricating interfaces 41 between the planet gears 36 and the carrier 37 with the filtered lubricant 58.

Referring to FIGS. 5A to 5C and 8, there is disclosed a method of performing maintenance on an aircraft gas turbine engine 10. The method includes removing the propeller shaft 16 of the engine 10 to form an axially and radially extending access volume at the center of the engine 10. The method includes performing maintenance (e.g. inspection, cleaning, replacement, repair, etc.) on a lubricant strainer 56 mounted at the carrier-output engagement location 39. The method may further include not disassembling the epicyclic gear train 30 of the engine 10. The method may include removing a casing for the RGB 20.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, although described herein as "compound", the planet gears 36 may be other types of gears which do not have compound stages, such as gears where the meshing members receive input from the sun gear 34 and also engage with the one or more ring gears 38. Yet further modifications could be implemented by a person of ordinary skill in the art in view of the present disclosure, which modifications would be within the scope of the present technology.

The invention claimed is:

1. A gas turbine engine, comprising:
  a power input and a power output; and
  an epicyclic gear train engaged with the power input and with the power output, the epicyclic gear train comprising:
    a sun gear defining a center axis and engaged with the power input;
    a plurality of planet gears mounted to a carrier and engaged to the sun gear, the plurality of planet gears rotatable about respective planet gear axes, the plurality of planet gears and the carrier rotatable about the center axis, the carrier engaged with the power output at a carrier-output engagement location;
    one or more ring gears in meshed engagement with the plurality of planet gears;
    a plurality of planet gear bearings, each planet gear bearing disposed between one of the plurality of planet gears and the carrier, a lubrication interface defined between each planet gear bearing and the one of the plurality of planet gears; and
    a bearing lubrication system including a lubricant supply conduit extending between a conduit inlet at the carrier-output engagement location and conduit outlets at the lubrication interfaces of the plurality of planet gear bearings, the bearing lubrication system including a lubricant strainer mounted about the conduit inlet at the carrier-output engagement location.

2. The gas turbine engine of claim 1, wherein the power output includes an output shaft, the conduit inlet being one or more openings in the output shaft, the lubricant strainer covering the one or more openings in the output shaft.

3. The gas turbine engine of claim 2, wherein the output shaft is rotatable about an output shaft axis, the output shaft having an inner annular wall delimiting an interior of the output shaft, the one or more openings disposed on the inner annular wall, the lubricant strainer disposed within the interior of the output shaft and covering the one or more openings.

4. The gas turbine engine of claim 1, wherein the lubricant supply conduit includes a first segment extending through the power output, and a second segment extending downstream from the first segment and extending through the carrier to the conduit outlets at the lubrication interfaces.

5. The gas turbine engine of claim 4, wherein the second segment of the lubricant supply conduit includes a planet gear passage within each planet gear bearing of the plurality of bearings, the planet gear passages terminating at the lubrication interfaces.

6. The gas turbine engine of claim 4, wherein the second segment of the lubricant supply conduit includes one or more sun gear passages respectively terminating at one or more sun gear passage outlets to lubricate an engagement between the plurality of planet gears and the sun gear.

7. The gas turbine engine of claim 1, wherein the lubricant strainer is an annular body coaxial with the center axis.

8. The gas turbine engine of claim 1, wherein the lubricant strainer is an annular body having a frusto-conical shape.

9. The gas turbine engine of claim 1, wherein the power output includes an output shaft rotatable about an output shaft axis and extending between a first end engaged to the carrier at the carrier-output engagement location and a second end spaced axially apart from the first end, the output shaft defining a shaft interior, the conduit inlet in fluid communication with the shaft interior, and the lubricant strainer disposed within the shaft interior at the first end of the output shaft and covering the conduit inlet.

10. The gas turbine engine of claim 1, wherein each planet gear bearing includes a bearing shaft extending along one of the planet gear axes between opposed axial ends, one or more annular grooves defined in each of the axial ends of the bearing shaft.

11. The gas turbine engine of claim 1, wherein each of the plurality of planet gears has an input gear in meshed engagement with the sun gear, and output gears axially spaced from the input gear.

12. The gas turbine engine of claim 11, wherein the one or more ring gears include two ring gears axially spaced apart from each other, the two ring gears being fixed, each of the two ring gears in meshed engagement with one of the output gears.

13. A method of operating a reduction gearbox of an aircraft engine, the reduction gearbox having an epicyclic gear train with a sun gear, planet gears mounted to a carrier, and one or more ring gears, the method comprising: filtering a lubricant at a location where the carrier engages an output of the aircraft engine; and lubricating interfaces between the planet gears and the carrier with the filtered lubricant.

14. The method of claim 13, wherein lubricating the interfaces includes conveying the filtered lubricant through the output, through the carrier and to the interfaces.

15. The method of claim 14, wherein lubricating the interfaces includes conveying the filtered lubricant through the carrier to a meshed engagement between the planet gears and the sun gear.

16. The method of claim 13, comprising driving the output with the carrier to rotate the carrier and the output together.

17. The method of claim 16, comprising stopping rotation of the one or more ring gears.

18. The method of claim 13, comprising conveying the lubricant along an interior of the output, and filtering the lubricant includes filtering the lubricant within the interior of the output.

19. The method of claim 13, wherein filtering the lubricant includes filtering the lubricant from within the output.

20. The method of claim 13, wherein filtering the lubricant includes filtering the lubricant through an annular mesh.

* * * * *